United States Patent [19]

Carlson

[11] 4,225,911
[45] Sep. 30, 1980

[54] APPARATUS AND METHOD FOR REDUCING OVERVOLTAGE TRANSIENTS ON THE OUTPUTS OF A VSCF SYSTEM

[75] Inventor: Harold G. Carlson, Apalackin, N.Y.

[73] Assignee: General Electric Company, Wilmington, Mass.

[21] Appl. No.: 960,956

[22] Filed: Nov. 15, 1978

[51] Int. Cl.³ ............................................. H02M 5/00
[52] U.S. Cl. ..................... 363/50; 363/164; 363/161
[58] Field of Search ................. 363/39, 50, 159–162, 363/164–165; 361/58, 91, 111

[56] References Cited

U.S. PATENT DOCUMENTS

| | | | |
|---|---|---|---|
| 3,256,244 | 6/1966 | Byloff et al. | 363/161 |
| 3,400,321 | 9/1968 | Lafuze | 363/50 X |
| 3,419,785 | 12/1968 | Lafuze | 363/50 |
| 3,431,483 | 3/1969 | Lafuze | 363/161 X |
| 3,593,106 | 7/1971 | Lafuze | 363/161 |
| 3,684,935 | 8/1972 | Sawyer et al. | 363/160 X |

*Primary Examiner*—J. D. Miller
*Assistant Examiner*—Peter S. Wong
*Attorney, Agent, or Firm*—I. David Blumenfeld

[57] ABSTRACT

An apparatus and method for reducing the overvoltage transients present on the alternating current power signals provided by the cycloconverters of a variable speed constant frequency (VSCF) system during the first several cycles of the alternating current after a load reduction or no-load condition occurs. An overvoltage transient reduction circuit is connected to each of the plurality of D.C. control signals provided by the phase voltage regulators to the waveform generator of a conventional VSCF system. The overvoltage transient circuit and method of the present invention senses the current amplitude level in each of the alternating current power signals in the VSCF system, and automatically reduces the voltage amplitude levels of the D.C. control signals provided by the phase voltage regulators to a preselected lower level within one-half cycle of the alternating current after a load reduction occurs. This reduction in the amplitude level of the D.C. control signals is maintained by the circuit and method of the present invention until the voltage regulating control loop of the conventional VSCF system can again assume control of the voltage levels of the alternating current power signals.

13 Claims, 10 Drawing Figures

APPARATUS AND METHOD FOR REDUCING OVERVOLTAGE TRANSIENTS ON THE OUTPUTS OF A VSCF SYSTEM

BACKGROUND OF THE INVENTION

1. Field of the Invention

The apparatus and method of the present invention relates generally to the reduction of overvoltage transients on the alternating current power signals produced by a conventional variable speed constant frequency (VSCF) power generation system after a load reduction or no-load condition occurs.

2. Description of the Prior Art

Variable speed constant frequency (VSCF) power generation systems are well-known, and such systems are being used in aircraft applications. Representative of conventional VSCF power generation systems are the systems disclosed in the following U.S. patents:

| | | |
|---|---|---|
| Re 26,630 | Peaslee | issued 7/15/69 |
| 3,152,297 | Peaslee | issued 10/6/64 |
| 3,289,070 | Caldwell et al | issued 11/29/66 |
| 3,320,514 | Lawrence | issued 5/16/67 |
| 3,400,321 | LaFuze | issued 9/3/68 |
| 3,419,785 | LaFuze | issued 12/31/68 |
| 3,593,106 | LaFuze | issued 7/13/71 |
| 3,641,418 | LaFuze | issued 2/8/72 |
| 3,745,471 | LaFuze | issued 7/10/73 |
| 3,873,928 | LaFuze | issued 3/25/75 |
| 3,902,073 | LaFuze | issued 8/26/75 |
| 3,908,161 | Messenger | issued 9/23/75 |

An excellent generalized discussion of conventional VSCF systems is found in *Aircraft Electrical Power Seminar—Technical Proceedings,* General Electric Company, Aircraft Equipment Division, Binghamton, N.Y., May 10–11, 1977.

Conventional VSCF power generation systems produce overvoltage transients on the alternating current power signals provided by the cycloconverters for the first several cycles, e.g., 3 to 4 cycles, of the alternating current after a load reduction or no-load condition occurs. These overvoltage transients on the alternating current power signals cause several problems with conventional VSCF power generation system, including (1) miscommutations of the SCR's of the cycloconverters due to the decrease in commutating time resulting from the increased voltage level and the leading current drawn by the filter capacitors connected to the alternating current power output signals from the cycloconverters; (2) equipment malfunctions of the equipment loads connected to the alternating current power signals caused by the overvoltage transients on the alternating current power signals.

The overvoltage transients which appear for the first several cycles of the alternating current after a load reduction or no-load condition occurs in a conventional VSCF power generation system are due to two factors. Each cycloconverter in a conventional VSCF power generation system exhibits a source impedance, and must also be provided at its output with a capacitor having a high capacitance value, which acts as a low pass filter to remove the rectifier ripple components generated by the cycloconverters on the alternating current power signals. When a load reduction or no-load condition occurs, the voltage levels of the alternating current power signals increase above the voltage level specification because of the large leading current drawn by the filter capacitors and because of the source impedance of the cycloconverters. The individual phase voltage regulators of the conventional VSCF system are unable to reduce the voltage levels of the alternating current power signals within the first several cycles, e.g., 3 to 4 cycles, after the load reduction or no-load condition occurs because of the slowness of the voltage regulating control loop. The speed of the voltage regulating control loop cannot be increased in conventional VSCF power generation systems because of the loop instabilities that are introduced.

Thus, the voltage levels of the alternating current power signals provided by a conventional VSCF power generation system increase above the voltage level specification for the first several cycles of the alternating current power signals after a load reduction or no-load condition occurs. The overvoltage transients which occur for the first several cycles of the alternating current after a load reduction or no-load condition occurs are particularly troublesome with respect to commutation of the SCR's of the cycloconverter. Specifically, miscommutation of the SCR's substantially increases because of the reduction in available commutating time due to the voltage increase of the alternating current power signals and the large leading currents drawn by the filter capacitors connected to the outputs of the cycloconverters. Miscommutation problems could be reduced if the voltage level of the alternating current power during the first few cycles after a load reduction or no-load condition occurs could be reduced so as to provide the cycloconverters with more circuit turn-off time so as to provide the needed time to commutate naturally the SCR's. In this connection, it should be noted that it is more difficult to commutate a zero power factor load, such as the filter capacitors connected to the outputs of the cycloconverter, than it is to commutate a unity power factor load. In a no-load condition, the cycloconverters of a conventional VSCF power generation system elecrtrically see only the zero power factor load produced by the filter capacitors. Thus, for purposes of reducing miscommutations of the SCR's of the cycloconverters of a conventional VSCF power generation system, it would be advantageous to reduce the transient overvoltage increase of the alternating current power signals which occurs during the first several cycles after a load reduction or no-load condition occurs.

SUMMARY OF THE INVENTION

It is an object of the present invention to provide an apparatus and method for substantially reducing the transient overvoltage condition which occurs during the first several cycles of the alternating current produced by a conventional VSCF power generation system after a load reduction or no-load condition occurs.

It is another object of the present invention to provide an apparatus and method having a response time of within one-half cycle of the alternating current power signals after a load reduction or no-load condition occurs for substantially reducing the transient overvoltage condition of the alternating current power signals.

It is further an object of the present invention to provide an apparatus and method for reducing the voltage levels of the D.C. control signals provided by the phase voltage regulators to a preselected lower level within one-half cycle of the alternating current power signals after a load reduction or no-load condition occurs.

Finally, it is an object of the present invention to provide an apparatus and method to control the voltage level of the alternating current power signals from the time immediately after a load reduction or no-load condition occurs until the voltage regulating loop of a conventional VSCF power generation system can again reassert control of the voltage levels of the alternating current power signals.

In summary, the apparatus and method of the present invention acts to limit the voltage levels of the alternating current power signals produced by the cycloconverters of a variable speed constant frequency (VSCF) power generation system to the voltage level specification from the time immediately after a load reduction or no-load condition occurs until the voltage regulating control loop of the conventional VSCF system can again reassert control of the voltage amplitude levels of the alternating current power signals. The substantial reduction in the transient overvoltage condition of the alternating current power signals is provided by the apparatus and method of the present invention by reducing the voltage levels of the D.C. control signals provided by the conventional phase voltage regulators to a preselected lower voltage level within one-half cycle of the alternating current power signals after the load reduction or no-load condition occurs. The reduction in the voltage levels of the D.C. control signals is maintained by the apparatus and method of the present invention until the voltage regulating control loop of the conventional VSCF power generation system can again reassert proper control of the voltage levels of the D.C. control signals.

In one embodiment of the apparatus and method of the present invention, the reduction of the D.C. control signals is produced within one-half cycle of the alternating current power signals after a load reduction or no-load condition occurs by the use of current sensing transformers, which are responsive to the current levels of each of the alternating current power signals. The output signals from each of the current sensing transformers is rectified by a full wave rectifier connected so as to provide a positive direct current control signal having a ripple component to a second node. The ripple component has a frequency which is two times the number of alternating current power signals being sensed. The amplitude level of the control signal is proportional to the amount of current in the alternating current power signals and, thus, indicates a load reduction or no-load condition.

Each of the D.C. control signals provided by the phase voltage regulators is connected to a first node via a rectifier, such as a diode. Each diode is connected so as to be in the conductive state when its associated D.C. control signal has a positive polarity. A second node provided with the control signal from the current sensing circuit is connected to the first node via a resistor of high ohmic value and a capacitor. The second node is connected to an electrical ground by a resistor having a low ohmic value. The low ohmic value resistor is selected to give the correct transient loading on circuits 27, 28 and 29 when a load reduction or no-load condition occurs. The transient loading produces a voltage drop across resistors 62, 66 and 68 which instantly reduces the level of the D.C. control signals to the proper value for the new load condition.

The value of the capacitor is selected so that it connects the diodes to the resistor having a low ohmic value for a sufficient number of cycles of the alternating current power signals after the load reduction or no-load condition occurs until the voltage regulating control loop of the conventional VSCF system can again reassert control of the voltage levels of the alternating current power signals. The large ohmic value resistor is connected in shunt with the capacitor to discharge the capacitor when the diodes are back-biased.

BRIEF DESCRIPTION OF THE DRAWINGS

FIG. 3 is a block diagram of the phase voltage regulating loop showing the compensating signal $$(\Delta I_l Z_o/44)\frac{S+10}{S+950}$$

provided by the apparatus and method of the present invention immediately after a load reduction or no-load condition occurs.

DETAILED DESCRIPTION OF THE INVENTION

In summary, the apparatus and method of the present invention substantially reduces the transient overvoltage condition, which occurs for the first several cycles of the alternating current power signals after a load reduction or no-load condition occurs, by reducing the voltage levels of the D.C. control signals provided by the phase voltage regulators of a conventional VSCF power generation system to a preselected lower level within one-half cycle of the load reduction or no-load condition until the voltage regulating control loop of the conventional VSCF system can again reassert control of the voltage amplitude levels of the alternating current power signals.

For the purposes of this specification, the term "load condition" refers to a normal steady state load condition within system specification of the alternating current power signals. The term "load reduction condition" denotes the condition when the load on the alternating current power signals is changed and reduced from the load condition, but is still present in reduced amount. The term "no-load condition" refers to the condition when the load on the alternating current power signals is completely removed. The term "voltage level specification" denotes the voltage amplitude range at which the VSCF system is to maintain the alternating current power signals.

In order to understand the structure and operation of the apparatus and method of the present invention, it is necessary first to understand why the transient overvoltage condition of the alternating current power signals occurs after a load reduction or no-load condition takes place.

Figure 1:
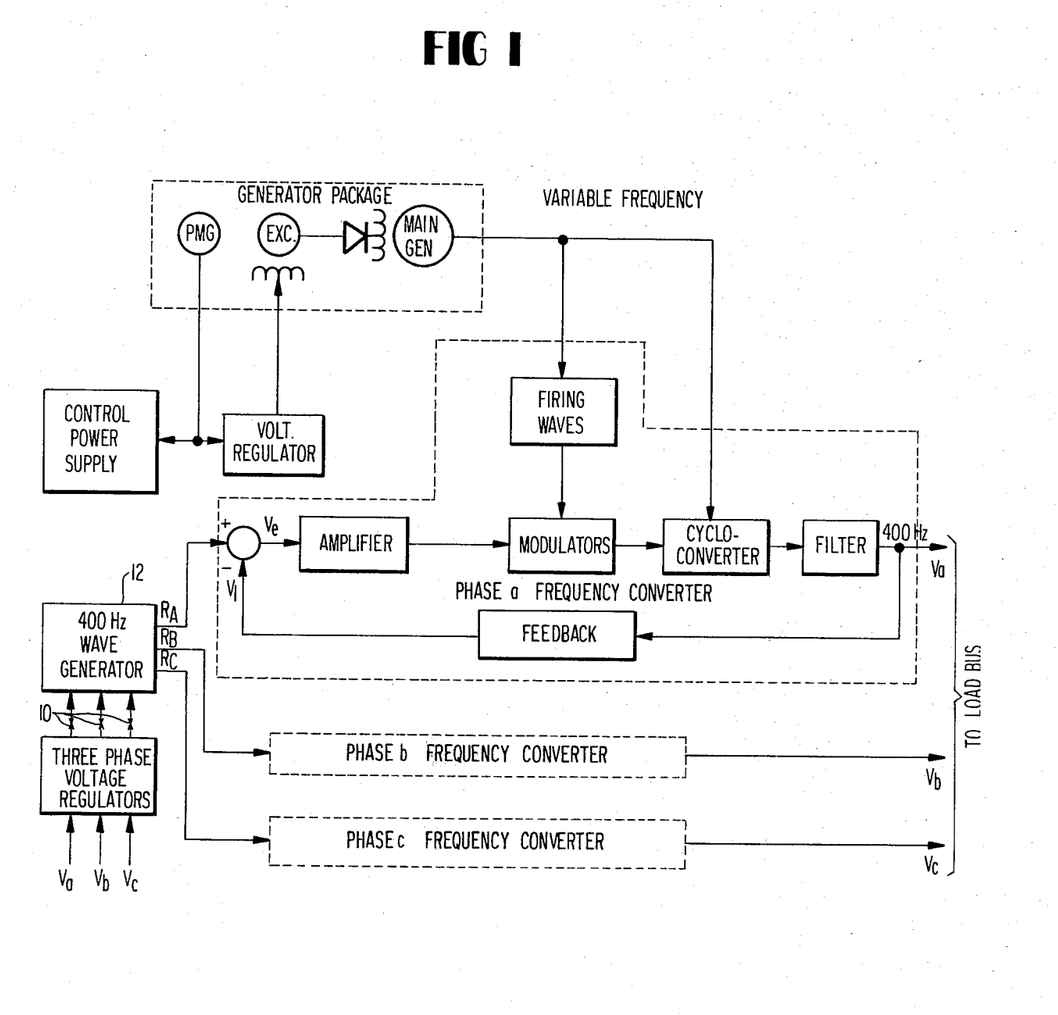
FIG. 1 is a system block diagram of a conventional VSCF power generation system and indicates by reference arrow 10 where the apparatus and method of the present invention is added to the conventional VSCF power generation system.

FIG. 1 shows a conventional three phase, 115 volt A.C., 400 Hz, VSCF power generation system. In addition, such conventional VSCF power generation systems are described in detail in the references noted above and the teachings of these references are incorporated by reference into this specification. It should be understood that the apparatus and method of the present invention is applicable to any phase, any A.C. voltage level, and any frequency VSCF system, and that the VSCF system shown in FIG. 1 is only selected for purposes of explanation.

Under normal operating conditions when a load condition is present with respect to the alternating current power signals, the voltage amplitude levels of these alternating current power signals are maintained at a preselected amplitude value range by a voltage regulation control loop made up of the three phase voltage regulators, the 400 Hz wave generator, and the phase a, b and c frequency converters. As is shown in FIG. 1, each of the frequency converters a, b and c includes a cycloconverter having a plurality of SCR's and a filter, which provides as its output the respective alternating current power signals $V_a$, $V_b$, $V_c$.

Each filter stage includes a capacitor having a high capacitance value which is connected from the output of the associated cycloconverter to an electrical ground. The high capacitance value of the capacitor results in its acting as a low pass filter for removing the rectifier ripple components from the alternating current power signals generated by the switching action of the SCR's in the associated cycloconverter. In addition, each cycloconverter exhibits a finite source impedance.

When a load reduction or no-load reduction condition occurs, the voltage levels of the alternating current power signals rise above the voltage level specification range because of the source impedances of the cycloconverters and the large leading currents drawn by the capacitors of the associated filters. The individual phase voltage regulators are unable to reduce the overvoltage transient condition of the alternating current power signals for at least the first few cycles, e.g., 3 to 4 cycles, after the load reduction or no-load condition occurs because the voltage regulating control loops (each voltage regulating control loop includes the respective individual phase voltage regulator, the 400 Hz. wave generator, the respective amplifier, modulator, cycloconverter and filter) are too slow to regain control of the voltage amplitude levels of the alternating current power signals for at least the first several cycles of the alternating current after the load reduction or no-load condition occurs. The speed of the voltage regulating control loop cannot be increased, in a conventional VSCF power generation system, because system loop instabilities would be introduced. Thus, in conventional VSCF power generation systems, the overvoltage transient condition of the alternating current power signals which are present for the first several cycles of the alternating current after the load reduction or no-load condition occurs cannot be eliminated.

The overvoltage transient condition on the alternating current power signals of a conventional VSCF power generation system result in several problems. First, miscommutations of the SCR's of the cycloconverters are substantially increased. This increase in miscommutation is due to the high frequency of the generator (e.g. 3,500 Hz.), the overvoltage condition on the alternating current power signals and the large leading currents drawn by the output filter capacitors. These three factors act to reduce substantially the circuit turn-off time of the SCR's of the cycloconverters, which means there is less time to commutate naturally the SCR's of the cycloconverters. It should be noted that it is more difficult to commutate naturally a zero power factor load, such as the filter capacitors, than it is to commutate a unity power factor load which is substantially the case for most normal load conditions. By reducing very rapidly the overvoltage transient condition on the alternating current power signals after a load reduction or no-load condition occurs, the apparatus and method of the present invention substantially eliminates the miscommutation problem noted above.

An additional problem caused by the overvoltage transient condition is that it adversely affects the electrical performance of many of the other system loads which are connected to the alternating current power signals. The overvoltage transient problem in the VSCF power generation system is akin to the transient problem on conventional alternating current power generation systems, and should be reduced if possible.

The apparatus and method of the present invention substantially eliminates the transient overvoltage condition by reducing the voltage level of the VSCF D.C. control signals provided by the individual phase voltage regulators to the 400 Hz. wave generator to a preselected lower level. The D.C. control signals are reduced by the apparatus and method of the present invention to the preselected lower level within, for example, one-half cycle of the alternating current power signals after the load reduction or no-load condition occurs, and this reduction in amplitude levels is maintained by the apparatus and method of the present invention until the voltage regulating control loop can again reassert adequate control of the voltage amplitude levels of the alternating current power signals. Because the apparatus and method of the present invention has a fast response time, the apparatus and method of the present invention can substantially reduce the overvoltage transient condition.

Figure 2:
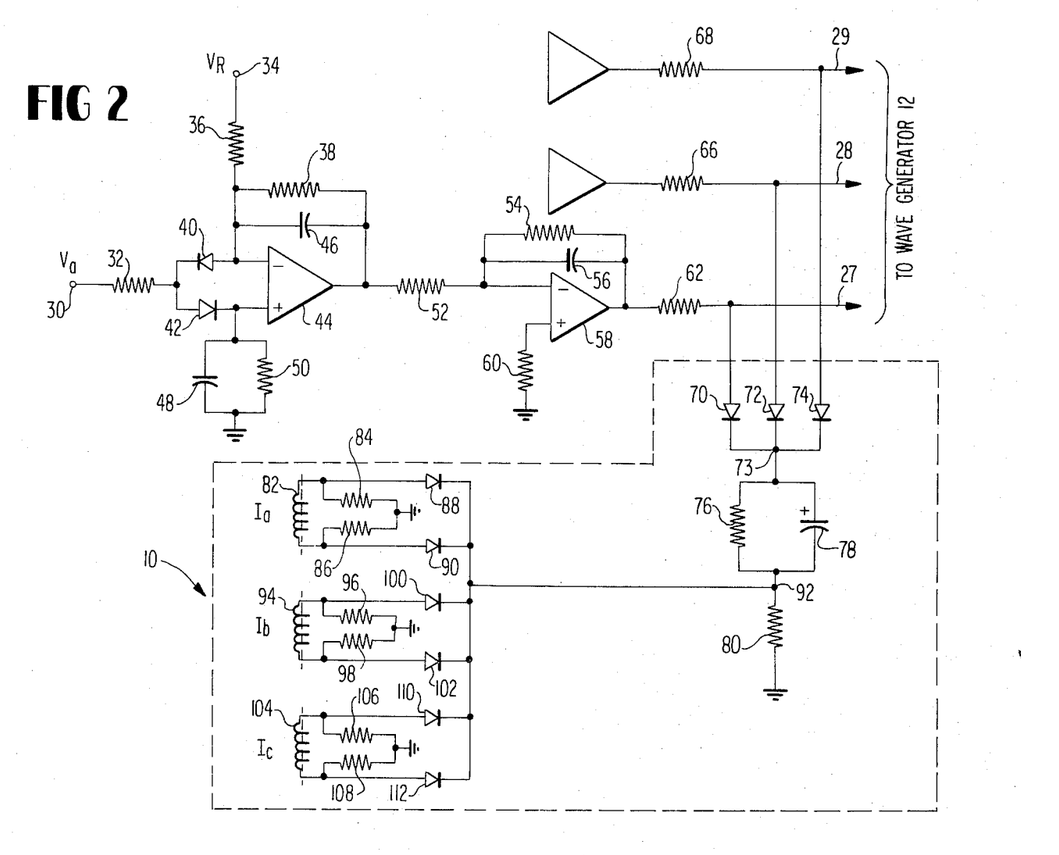
FIG. 2 is a schematic diagram of a portion of a phase voltage regulator of a conventional VSCF power generation system showing one embodiment of the apparatus of the present invention, as indicated by the dashed-line box 10.

Turning now to FIG. 2, one embodiment of the apparatus for producing the method of the present invention where the amplitude level of the D.C. control signals are reduced to a preselected lower level is shown.

The apparatus of the present invention according to the first embodiment are enclosed by the dashed lines indicated by reference arrow 10. The other electrical components shown in FIG. 2 constitute an embodiment of a conventional individual phase voltage regulator (see also FIG. 1). For a better understanding of the operation of the first embodiment, the conventional phase voltage regulator, as shown in FIG. 2, must first be explained.

An alternating current power signal, designated as $V_a$ of, for example, 115 volts A.C., 400 Hz. is applied to a node 30, which is connected to a first lead of a resistor 32. The second lead of resistor 32 is connected to the anode of a diode 42, whose cathode is connected to the noninverting input of an operational amplifier 44. Similarly, the second lead of resistor 32 is connected to the cathode of a diode 40, whose anode is connected to the inverting input of operational amplifier 44. The inverting input of operational amplifier 44 is also connected via a resistor 36 to a reference voltage source $V_R$ at a node 34. The reference voltage source $V_R$ has a D.C. amplitude value of, for example, 6.2 volts. The inverting input of operational amplifier 44 is also connected to the output thereof by a capacitor 46 and a resistor 38 connected in parallel. In addition, the noninverting input of operational amplifier 44 is connected to electrical ground via a capacitor 48 and a resistor 50 in parallel connection.

Diodes 40 and 42 and operational amplifier 44 act to rectify, filter and compare the scaled-down values of the alternating current power signal $V_a$ with the scaled-down reference voltage signal $V_R$. When the alternating current voltage $V_a$ has a zero value, for example, the output of the operational amplifier 44 is at a high negative value because the reference voltage $V_R$ is applied to the inverting input of the operational amplifier 44. As the value of the alternating current voltage $V_a$ increases, the output voltage of operational amplifier 44 also increases in a positive direction. It should be noted that the gain of the operational amplifier 44 is a low value because the resistance value of resistor 38 is less than the resistance value of resistor 32. Operational amplifier 44 is connected to act as a linear amplifier, and the low gain factor is necessary to prevent saturation which would cause it to no longer be linear. In addition, the time constant of the operational amplifier 44 stage is selected to have a break frequency which is substantially less than the frequency of the alternating current voltage $V_a$. The frequency is set by the wave generator, shown in FIG. 1, and is set, for example, at 400 Hz. Thus, some filtering of the ripple component on the D.C. signal present at the output of operational amplifier 44 occurs.

The output signal from operational amplifier 44 is connected via a resistor 52 to the inverting input of an operational amplifier 58. The inverting input of operational amplifier 58 is also connected to the output thereof by a resistor 54 and a capacitor 56. The noninverting input of operational amplifier 58 is connected to ground by a resistor 60.

Operational amplifier 58 is connected to operate as a linear amplifier and to invert and to amplify substantially the negative D.C. signal provided by resistor 52 to the inverting input. Operational amplifier 58 produces a substantial gain because the resistance value of resistor 54 is substantially larger than the resistance value of resistor 52. The high gain is needed to closely regulate the alternating current voltage $V_a$. A large value for capacitor 56 is needed to stabilize the voltage regulation control loop, as is discussed in greater detail below. However, this large value for capacitor 56 acts to slow down substantially the response time of the voltage regulation control loop. Resistor 60 acts to reduce the D.C. offset caused by the input offset currents of operational amplifier 58. As is now apparent, the D.C. voltage present at the output of operational amplifier 58 has a positive value when the alternating current voltage $V_a$ has a value greater than zero.

A resistor 62 is connected to the output of operational amplifier 58 and provides to a line 27, connected to the 400 Hz. wave generator (not shown in FIG. 2), the positive D.C. control signal from operational amplifier 58. The resistor 62 is necessary so that the operational amplifier 58 exhibits a finite source impedance. The D.C. control voltage on line 27 is provided to the 400 Hz. wave generator, as are the D.C. control voltages on lines 28 and 29, which are provided by the other two phase voltage regulators not shown in detail in FIG. 2.

The apparatus of the present invention according to the first embodiment is now explained. A current sensing transformer 82 responsive to the amplitude level of the current $I_a$ in phase a output of the converter is connected via resistors 84 and 86 to electrical ground and via diodes 88 and 90 to a second node 92. Diodes 88, 90 are connected to act as a full wave rectifier and to provide a positive D.C. voltage with a 800 Hz. ripple to second node 92. Similarly, a current sensing transformer 94 responsive to the amplitude level of the current $I_b$ in phase b output of the converter is connected to ground via resistors 96 and 98 and to second node 92 via rectifier diodes 100 and 102. In addition, a current sensing transformer 104 responsive to the amplitude level of the current $I_c$ in phase c output of the converter is connected to electrical ground via resistors 106 and 108 and to second node 92 via rectifier diodes 110 and 112. Transformers 94 and 104, like transformers 82, provide a positive D.C. signal with 800 Hz. ripple components to second node 92.

The D.C. signal at second node 92 has a ripple frequency of 2,400 Hz. due to the summing of the three 800 Hz. ripple components from the current sensing transformers 82, 94 and 104, respectively.

A rectifier 70, such as a silicon diode, is connected between line 27 and a first node 73. Similarly, a rectifier 72, such as a silicon diode, is connected between line 28 (the D.C. control signal provided by the phase voltage regulator for alternating current voltage $V_b$) and first node 73, while a rectifier 74, such as a silicon diode, is connected between line 29 (the D.C. control signal provided by the phase voltage regulator for alternating current voltage $V_c$) and first node 73. Diodes 70, 72 and 74 are connected so that they provide the positive D.C. control signals on lines 27, 28 and 29, respectively, to a first node 73 when they each are biased in the forward direction.

A resistor 76 is connected between first node 73 and second node 92. Similarly, a capacitor 78 is connected between first node 73 and second node 92. A resistor 80 is connected between second node 92 and electrical ground.

The resistance value for resistor 76 is selected to discharge capacitor 78 when diodes 70, 72 and 74 are back-biased without adding significant loading at circuits 27, 28 and 29 when diodes 70, 72 and 74 are forward-biased during steady-state operation (no load transients on power lines). During load transients on the power lines, the signal at node 92 will change.

The capacitance value for capacitor 78 is selected so that capacitor 78 appears to be an electrical short across resistance 76 for a selected number of cycles of the alternating current after the load reduction or no-load condition takes place. Thus, the loading at circuits 27, 28 and 29 is determined by resistance 80 and the current transformer load resistance.

It should be noted that the amplitude level of the control signal at the second node controls in a linear fashion the voltage drop of the D.C. control signals on lines 27, 28 and 29 when the diodes 70, 72 and 74 are in the forward-bias state. It should be noted that the voltage is dropped across resistors 62, 66 and 68.

The selected number of cycles should be greater than the time delay of the voltage regulating control loop of the conventional VSCF system after the load reduction or no-load condition has taken place.

The resistance value for resistor 80 is selected so that the voltage drop at circuits 27, 28 and 29 during load reductions is just sufficient to bring the voltage at circuits 27, 28 and 29 to the new steady-state value for the reduced load condition.

After the selected number of cycles has lapsed, the capacitor 78 again appears to be an electrical open circuit and the D.C. control signals on lines 27, 28 and 29 are not substantially controlled by resistors 76 and 80, but are substantially controlled by the voltage regulating control loop of the conventional VSCF power generation system. Thus, the apparatus and method of the present invention reduces the D.C. control signals on lines 27, 28 and 29 to the new steady state value within the first one-half cycle of the occurrence of the load reduction or no-load condition. The voltage regulating control loop of the conventional VSCF power generation system then assumes control of the voltage of the alternating current power signals.

It should be noted that the apparatus and method of the present invention can only substantially reduce the overvoltage transient after the first half of the alternating current because of the time delay introduced by the filter stages connected to the outputs of the cycloconverters. In other words, the apparatus and method of the present invention cannot completely eliminate the overvoltage transient condition on the first half cycle of the alternating current power signals after the load reduction or no-load condition occurs because of the time delay in the correction caused by the output filter capacitors.

Table 1 below lists representative component values for the embodiment of the apparatus and method of the present invention shown in FIG. 2 for a three phase, 115 volt A.C., 400 Hz., VSCF power generation system connected to a 30/40 KVA load.

TABLE 1

| Component Name & Number | Value |
|---|---|
| Resistor 32 | 200KΩ |
| Resistor 36 | 10KΩ |
| Resistor 38 | 100KΩ |
| Diode 40 | 1N4148 |
| Diode 48 | 1N4148 |
| Operational Amplifier 44 | |
| Capacitor 46 | .01μF |
| Capacitor 48 | .01μF |
| Resistor 50 | 10KΩ |
| Resistor 52 | 10KΩ |
| Resistor 54 | 487KΩ |
| Capacitor 56 | |
| Operational Amplifier 58 | |
| Resistor 60 | 10KΩ |
| Resistor 62 | 3KΩ |
| Diode 70 | 1N4148 |
| Diode 72 | 1N4148 |
| Diode 74 | 1N4148 |

TABLE 1-continued

| Component Name & Number | Value |
|---|---|
| Resistor 76 | 100K |
| Capacitor 78 | 1μF |
| Resistor 80 | 4KΩ |
| Current Sensing Transformer 82 | 1000:1 turns ratio |
| Resistor 84 | 442Ω |
| Resistor 86 | 442Ω |
| Diode 88 | 1N4148 |
| Diode 90 | 1N4148 |
| Current Sensing Transformer 94 | 1000:1 turns ratio |
| Resistor 96 | 442Ω |
| Resistor 98 | 442Ω |
| Diode 100 | 1N4148 |
| Diode 102 | 1N4148 |
| Current Sensing Transformer 104 | 1000:1 turns ratio |
| Resistor 106 | 442Ω |
| Resistor 108 | 442Ω |
| Diode 110 | 1N4148 |
| Diode 112 | 1N4148 |

Figure 3:
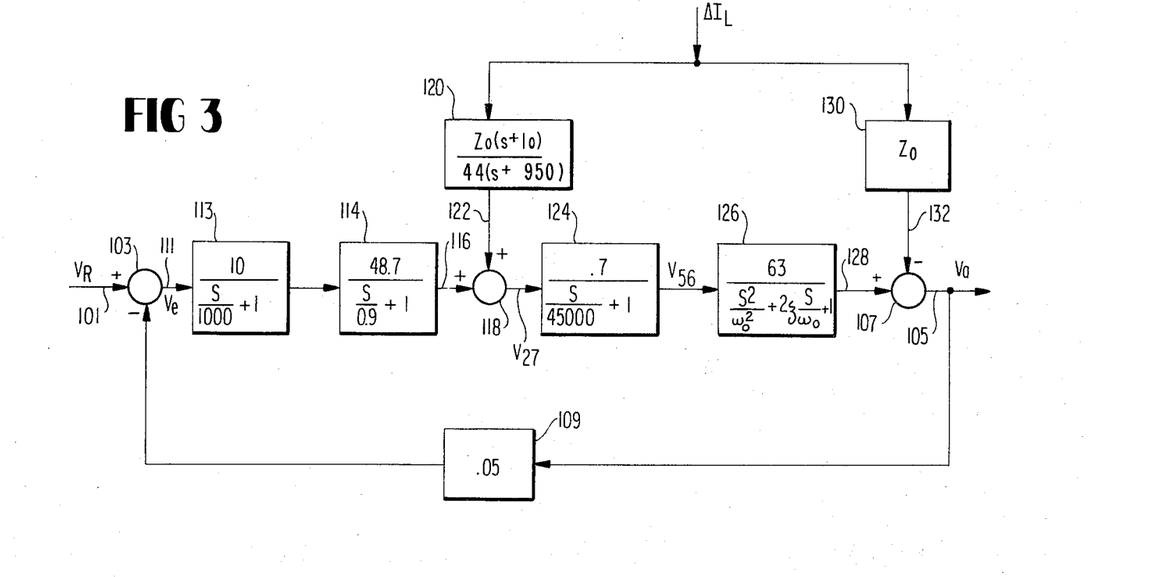

Turning now to FIG. 3, the block diagram of the voltage regulating control loop of a conventional VSCF power generation system for one cycloconverter is shown with the overvoltage transient compensating signal provided by the apparatus and method of the present invention. The values of the transfer functions shown in block diagram of FIG. 3 are those of a three phase, 115 volt A.C., 400 Hz, 40 KVA VSCF power generation system having the component values listed in Table 1.

The reference voltage source $V_R$ is applied to one input of a summer 103 in a positive sense. The alternating current power signal $V_a$ is rectified by diodes 40 and 42 (FIG. 2) and after scaling by resistor 32 (FIG. 2) is applied to a second input of summer 103 in a negative sense. The transfer function from $V_a$ to the summer 10 is 0.05, as shown in reference block 109. The resulting error voltage $V_e$ is amplified and compensated for the required regulation and stability by the forward path having the transfer functions in blocks 113, 114, 124 and 126. The symbol S in the transfer functions is the Laplace operator.

The signal $\Delta I_L$ is the change in load current produced by load switching. The change in load current $\Delta I$ flowing in the cycloconverter source impedance $Z_o$ produces the voltage transient at the output of the cycloconverter. The voltage disturbance $\Delta I_L Z_o$ enters the summer 107 at input 132 in a negative sense, i.e., an increase in load current subtracts from the voltage at 128 and a decrease in load current adds to the voltage at 128. The path through the source impedance $Z_o$ represents the normal voltage transient produced by load switching. It is this transient that is reduced by the compensating signal stage 120 of the apparatus and method of the present invention. The output 122 of stage 120 corresponds to the control signal present at node 73 of FIG. 2.

The compensating signal stage 120 has the following transfer function:

$$\frac{Z_o(S + 10)}{44(S + 950)} \tag{1}$$

where: $Z_o$ = source impedance of the cycloconverter

The compensating signal stage 120 provides an output signal to one input of summer 118 for the preselected number of cycles between the time when the load reduction or no-load reduction condition occurs and the time when the phase voltage regulating control loop of the conventional VSCF power generation system reassumes control of the amplitude levels of the alternating current power signals.

The output from summer 118 is applied to the wave generator stage 124, which provides 400 Hz. reference signals to the modulator. Wave generation stage 124 has the following transfer function:

$$\frac{.7}{\frac{S}{45000} + 1} \tag{2}$$

The output from wave generation stage 124 is applied to the modulator, cycloconverter and filter stages 126, which have the following composite transfer function:

$$\frac{63}{\frac{S^2}{W_O^2} + 2\xi \frac{S}{W_O} + 1} \tag{3}$$

where:
$W_O$ = natural frequency of filter (radians/second)
$\xi$ = damping ratio The output from the composite modulator, cycloconverter and filter stage 126 is applied to one input of summer 107. During the transient condition, the signal provided by the compensating stage 120 acts to cancel the voltage disturbance produced by the source impedance stage 130 at summer 107, which results in the substantial reduction of the transient overvoltage signal which occurs after the load reduction or no-load condition occurs. In other words, the signal provided by the compensating signal stage 120 after having passed through the wave generation stage 124 and the composite modulator, cycloconverter and filter stage 126 cancels at summer 107 the transient overvoltage signal which is produced by the load reduction or no-load condition. This cancellation continues for the preselected number of cycles. After the transient has decayed, the gain of stage 120 is reduced by a factor of 10/0950 and the voltage regulating loop of the conventional VSCF power generation system again assumes proper control of the voltage amplitude levels of the alternating current power signals.

Figure 7:
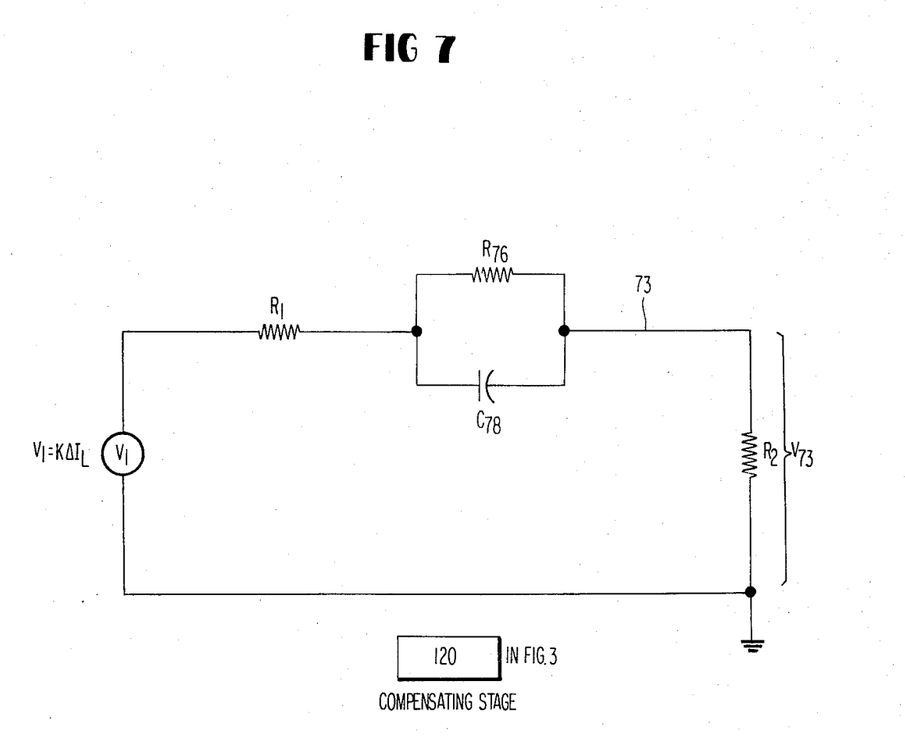
FIG. 7 is the equivalent circuit for the compensating stage 120 shown in FIG. 3.

The strength of the signal 122 applied to the summer 118 for perfect cancellation of the voltage disturbance $\Delta I_L Z_o$ is determined by solving for the voltage at node 73 produced by the current $\Delta I_L$. FIG. 7 is the equivalent circuit for the compensating stage 120. The constant K is determined from the current transformer ratio, the associated burden resistors and the rectifier connection. The resistance $R_1$ is the output impedance of the voltage source $V_1$, which includes the current transformer burden resistors and $R_{80}$. The resistance $R_2$ is the parallel combination of resistors $R_{62}$, $R_{66}$ and $R_{68}$. The solution for the voltage at node 73 ($V_{73}$) is:

$$V_{73}(S) = \frac{\frac{R_2}{R_1 + R_2}\left(S + \frac{1}{R_{76}C_{78}}\right)}{S + \frac{R_1 + R_2 + R_{76}}{C_{78}R_{76}(R_1 + R_2)}} (K \Delta I_L(S)) \tag{4}$$

For the values given in Table 1, equation (4) reduces to:

$$V_{73}(S) = \frac{.93(S + 10)}{(S + 950)} (K \Delta I_L(S)) \tag{5}$$

For a unit step change in excitation ($\Delta I_L(S) = 1/S$):

$$V_{73}(t) = .93K[\frac{1}{95} + \frac{94}{95} e^{-950t}] \tag{6}$$

For perfect compensation at $t = 0$, $$.93K = Z_o/44 \tag{7}$$

$$K = .24 Z_o \tag{8}$$

The oscillograms of FIGS. 4–6, which are explained next, are for a three phase, 115 volt A.C., 400 Hz., VSCF system and show the superior performance for substantially eliminating the transient overvoltage condition produced by the apparatus and method of the present invention.

Figure 4A:
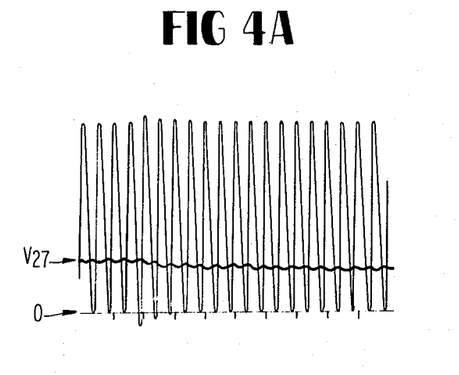
FIGS. 4A and 4B are oscillograms plotting an alternating current power signal and associated D.C. control signal for the case where an 18 KVA load is removed from a conventional VSCF system and from a VSCF system employing the apparatus and method of the present invention, respectively.

FIG. 4A is an oscillogram plotting an alternating current power signal and associated D.C. control signal $V_{27}$ for the case where an 18 KVA load is removed from a conventional VSCF system. As is seen by FIG. 4A, the transient overvoltage condition occurs for four full cycles of the alternating current power signals after the load is removed.

Figure 4B:
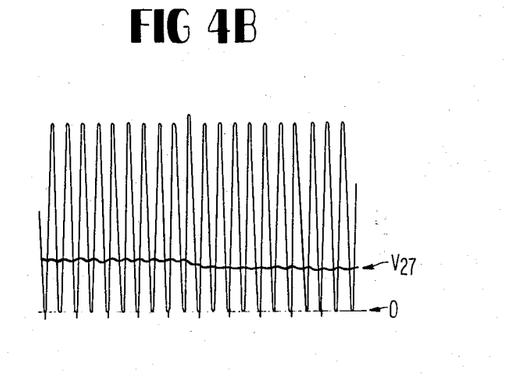

FIG. 4B is an oscillogram plotting an alternating current power signal and associated D.C. control signal $V_{27}$ in a case where an 18 KVA load is removed from a conventional VSCF system employing the apparatus and method of the present invention. As is seen in FIG. 4B, the amplitude level of the D.C. control signal $V_{27}$ is reduced almost immediately after the load is removed, causing the overvoltage transient condition to exceed the predetermined level for only one-half cycle of the alternating current power signal. In addition, it should be noted that the amplitude level of the one-half cycle immediately after the load is removed is substantially less than the voltage level of the corresponding one-half cycle shown in FIG. 4A.

Figure 5A:
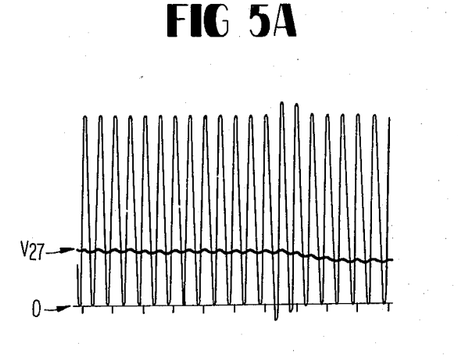
FIGS. 5A and 5B are oscillograms plotting an alternating current power signal and associated D.C. control signal for the case where a 27 KVA load is removed from a conventional VSCF system and from a VSCF system employing the apparatus and method of the present invention, respectively.

FIG. 5A is an oscillogram plotting an alternating current power signal and associated D.C. control signal $V_{27}$ for the case where a 27 KVA load is removed from a conventional VSCF system. As is seen in FIG. 5A, the transient overvoltage condition continues for four full cycles after the load is removed, and the amplitude level of the D.C. control signal is slowly reduced to the predetermined level over a time period equal to four full cycles of the alternating current power signal.

Figure 5B:
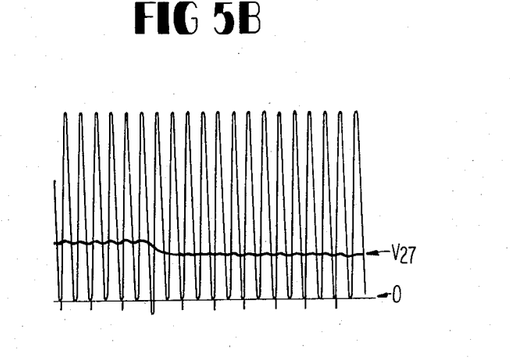

FIG. 5B is an oscillogram plotting an alternating current power signal and associated D.C. control signal for the case where a 27 KVA load is removed from a conventional VSCF system employing the apparatus and method of the present invention. As is seen in FIG. 5B, the transient overvoltage condition occurs only for the first half cycle after the load is removed, and its amplitude level is substantially less than the amplitude level of the corresponding first half cycle shown in FIG. 5A. In addition, it should be noted that the amplitude level of the D.C. control signal $V_{27}$ is reduced to the preselected lower level within the first half cycle after the load is removed.

Figure 6A:
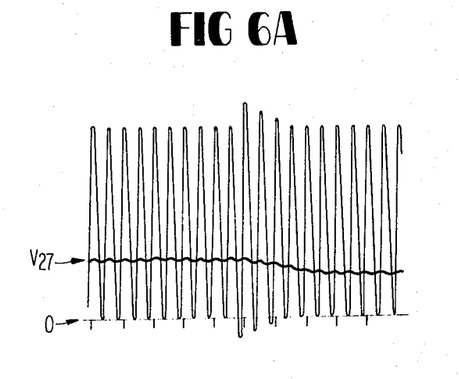
FIGS. 6A and 6B are oscillograms plotting an alternating current power signal and associated D.C. control signal for the case where a 40 KVA load is removed from a conventional VSCF system, and from a VSCF system employing the apparatus and method of the present invention, respectively.

FIG. 6A is an oscillogram plotting an alternating current power signal and associated D.C. control signal $V_{27}$ for the case where a 40 KVA load is removed from a conventional VSCF system. As is seen in FIG. 6A, the transient overvoltage condition is present for the first four and one-half cycles after the load is removed, and the amplitude level of the D.C. control signal $V_{27}$ is slowly reduced to the preselected lower level in the time period corresponding to the four and one-half cycles of the alternating current power signal.

Figure 6B:
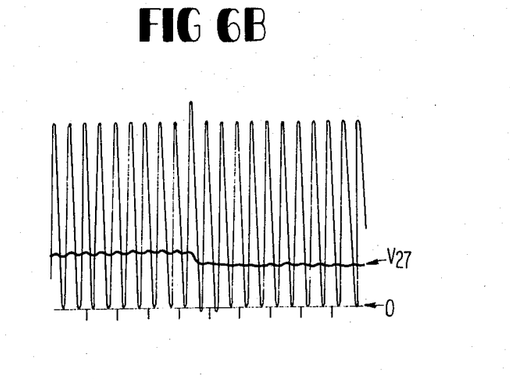

FIG. 6B is an oscillogram plotting an alternating current power signal and associated D.C. control signal $V_{27}$ for the case where a 40 KVA load is removed from a conventional VSCF system employing the apparatus and method of the present invention. As is seen in FIG. 6B, the transient overvoltage condition occurs only for the first one-half cycle after the load is removed, and its amplitude level is substantially less than the amplitude level of the corresponding first half cycle shown in FIG. 6A. In addition, it should be noted that the amplitude level of the D.C. control signal $V_{27}$ is reduced to the preselected lower level within the first one-half cycle after the load is removed.

As is seen by the oscillograms described above, the apparatus and method of the present invention substantially reduces the transient overvoltage condition which occurs after a load reduction or no-load condition occurs until the voltage regulating control loop of the conventional VSCF system again effectively assumes control of the amplitude level of the alternating current power signals.

It should be noted that the embodiment for implementing the method of the present invention shown in FIG. 2 is only illustrative, and other embodiments which produce the same function are included within the scope of this specification. In addition, it should be noted that the polarity of the control signal at the second node can be reversed with corresponding reversal of the diodes if the D.C. control signals have a negative D.C. value.

The apparatus of the present invention can be fabricated in discreet component form, or it can be fabricated using any type of presently available integrated circuit technique including hybrid integrated circuit technology and the like. The apparatus and method of the present invention is applicable for any VSCF power generation system of any phase, voltage level and preselected frequency.

What is claimed is:

1. A cycloconverter of the type having a source of multiphase electric power, a plurality of cycloconverter power source means connected to said multiphase electric power, each said cycloconverter power source means responsive to a gating signal for providing one of a plurality of alternating current power signals of a preselected frequency, first means responsive to each of said alternating current power signals for providing a plurality of reference signals of said preselected frequency having voltage amplitudes controlled in accordance with voltage levels of said alternating current power signals, a plurality of gating signal means, each of said gating signal means having an input responsive to one of said reference signals for providing said gating signal to one of said cycloconverter power source means, the improvement comprising:
   second means responsive to the current levels of said alternating current power signals for reducing said voltage amplitudes of said reference signals to a preselected lower level within a cycle of said alternating current power signals after a load reduction condition or a no-load condition with respect to said alternating current power signals occurs.

2. The cycloconverter as defined in claim 1, wherein said preselected power level of said reference signals is set in accordance with said current levels of said alternating current power signals.

3. The cycloconverter as defined in claim 1, wherein said second means includes:
   load sensing means responsive to each of said alternating current power signals for providing a control signal at a high state when a load condition is present and for providing said control signal at a low state when said load reduction condition or said no-load condition occurs, and
   third means responsive to said control signal for reducing said voltage amplitudes of each of said reference signals to said preselected lower level for a preselected number of cycles of said alternating current power signals when said control signal is in said low state, whereby voltage level transients on said alternating current power signals due to the load reduction or the no-load condition are reduced.

4. The cycloconverter as defined in claim 3, wherein said third means includes a plurality of diodes, each said diode having an anode connected to one of said reference signals and a cathode connected to a first node, and
   wherein said third means further includes a bias means responsive to said control signal for back-biasing said diodes when said control signal is in said high state and for forward biasing said diodes so as to connect same with an electrical ground when said control signal is in said low state.

5. The cycloconverter as defined in claim 4, wherein said bias means includes a first resistor having a high ohmic value connected between said first node and a second node, a capacitor connected between said first node and said second node, a second resistor having a low ohmic value connected between said second node and said electrical ground, and said control signal applied to said second node.

6. The cycloconverter as defined in claim 5, wherein said preselected lower level of said reference signals is set by said control signal at said low state in accordance with said current levels of said alternating current power signals.

7. The cycloconverter as defined in claim 1, wherein said second means includes means responsive to said current levels of said alternating current power signals for connecting said reference signals via a high impedance to an electrical ground when a load condition with respect to said alternating current power signal is present, and for connecting said reference signals via a low impedance to said electrical ground for a preselected number of cycles of said alternating current power signals when said load reduction condition or said no-load condition is present.

8. The cycloconverter as defined in claim 7, wherein said means responsive to said current levels includes a plurality of diodes, each said diode having an anode connected to one of said reference signals and a cathode connected to a first node, a first resistor having a high ohmic value connected between said first node and a second node, a capacitor connected between said first node and said second node, a second resistor with low ohmic value connected between said second node and said electrical ground, and a control signal indicative of said current levels applied to said second node.

9. A cycloconverter of the type having a source of multiphase electric power, a plurality of cycloconverter power source means connected to said multiphase electric power, each said cycloconverter power source means responsive to a gating signal for providing one of a plurality of alternating current power signals of a preselected frequency, first means responsive to each of said alternating current power signals for providing a plurality of reference signals of said preselected frequency having voltage amplitudes controlled in accordance with voltage levels of said alternating current power signals, a plurality of gating signal means, each of said gating signal means having an input responsive to one of said reference signals for providing said gating signal to one of said cycloconverter power source means, the improvement comprising:

sensing means responsive to each of said alternating current power signals for providing a control signal at a high state when a load condition is present, and for providing said signal at a low state when a load reduction condition or a no-load condition with respect to said alternating current power signal occurs; and fourth means responsive to said control signal for reducing said voltage amplitude of each of said reference signals to a preselected lower level for at least one full cycle of said alternating current power signals when said control signal is at said low state, whereby voltage level transients on said alternating current power signals due to said load reduction condition or said no-load condition are reduced.

10. The cycloconverter as defined in claim 9, wherein said preselected lower level is controlled by said control signal at said low state so that the voltage levels of said alternating current power signals do not exceed a preselected maximum voltage level value for more than one-half cycle of said alternating current power signals after said load reduction condition or said no-load condition occurs.

11. The cycloconverter as defined in claim 9, wherein said load sensing means includes a plurality of current transformers, each said current transformer responsive to the current level of one of said alternating current power signals, each said current transformer having a first winding with a first lead and a second lead, a plurality of first resistors, a first group of said plurality of first resistors connected between an electrical ground and each of said first leads, a second group of said plurality of first resistors connected between said electrical ground and each of said second leads, a plurality of rectifier means connected between said first lead and a second node and said second leads and said second node so as to provide a D.C. voltage having a low level ripple component at said second node, wherein said D.C. voltage with the low level ripple component at said second node is said control signal.

12. The cycloconverter as defined in claim 11, wherein said fourth means includes a plurality of diodes, each said diode having an anode connected to one of said reference signals and a cathode connected to a first node, a second resistor having a high ohmic value connected between said first node and said second node, a capacitor connected between said first node and said second node, and a third resistor having a low ohmic value connected between said second node and said electrical ground.

13. In a cycloconverter method of the type comprising the steps of generating multiphase electric power of a variable frequency, applying said multiphase electric power to a plurality of cycloconverter power source means for providing in accordance with a plurality of gating signals a plurality of alternating current power signals of a preselected frequency, sensing said alternating current power signals for providing a plurality of reference signals of said preselected frequency having voltage amplitudes controlled in accordance with voltage levels of said alternating current power signals, generating said gating signals in accordance with said reference signals, and applying said gating signals to said cycloconverter power source means, the improvement comprising the steps of:

sensing said alternating current power signals for providing a control signal at a high state when a load condition is present, and for providing said control signal at a low state when a load reduction condition or a no-load condition with respect to said alternating current power signals occurs; and reducing said voltage amplitude of each of said reference signals to a preselected lower level when said control signal is at said low state.

* * * * *